United States Patent
Baldwin (10) Patent No.: US 9,207,810 B1
(45) Date of Patent: Dec. 8, 2015

(54) FIBER-OPTIC TOUCH SENSOR

(75) Inventor: Leo B. Baldwin, San Jose, CA (US)

(73) Assignee: AMAZON TECHNOLOGIES, INC., Reno, NV (US)

(*) Notice: Subject to any disclaimer, the term of this patent is extended or adjusted under 35 U.S.C. 154(b) by 167 days.

(21) Appl. No.: 13/297,127

(22) Filed: Nov. 15, 2011

(51) Int. Cl.
*G06F 3/042* (2006.01)

(52) U.S. Cl.
CPC ............ *G06F 3/0421* (2013.01); *G06F 3/0428* (2013.01); *G06F 2203/04109* (2013.01)

(58) Field of Classification Search
CPC ..... G06F 3/044; G06F 3/0421; G06F 3/0428; G06F 2203/04105; G06F 2203/04109
USPC .............................. 178/18.01–18.09; 345/173
See application file for complete search history.

(56) References Cited

U.S. PATENT DOCUMENTS

| | | | |
|---|---|---|---|
| 4,616,107 A * | 10/1986 | Abe et al. | 178/18.06 |
| 5,825,352 A * | 10/1998 | Bisset et al. | 345/173 |
| 6,351,260 B1 * | 2/2002 | Graham et al. | 345/179 |
| 6,788,295 B1 * | 9/2004 | Inkster | 345/175 |
| 7,551,814 B1 * | 6/2009 | Smits | 385/24 |
| 2002/0015573 A1 * | 2/2002 | Ishibashi | 385/147 |
| 2004/0212603 A1 | 10/2004 | Cok | |
| 2008/0029691 A1 | 2/2008 | Han | |
| 2008/0146285 A1 | 6/2008 | Lee et al. | |
| 2009/0128499 A1 | 5/2009 | Izadi et al. | |
| 2009/0189878 A1 | 7/2009 | Goertz et al. | |
| 2010/0287470 A1 * | 11/2010 | Homma et al. | 715/702 |
| 2010/0302185 A1 * | 12/2010 | Han et al. | 345/173 |

OTHER PUBLICATIONS

"Non Final Office Action dated Dec. 11, 2013", U.S. Appl. No. 13/240,993.
Non-Final Office Action mailed Sep. 9, 2013; in corresponding U.S. Appl. No. 13/240,993.
Final Office Action mailed May 22, 2014; in corresponding U.S. Appl. No. 13/240,993.

* cited by examiner

*Primary Examiner* — Priyank Shah
*Assistant Examiner* — Chad Dicke
(74) *Attorney, Agent, or Firm* — Novak Druce Connolly Bove + Quigg LLP (57) ABSTRACT

A set of optical fibers can be used to enable touch input for a computing device. One or more light sources, such as infrared (IR) light emitting diodes (LEDs), can direct radiation into one or more fibers that propagates down the fibers and is detected by one or more sensors. If a user places a finger at a position where a portion of a fiber is exposed, a portion of the light propagating down the fiber will not undergo total internal reflection (TIR) and instead will be transmitted out of the fiber, causing a reduction in the amount of light received from that fiber to one of the sensors. By monitoring losses for the fibers and knowing the area at which each fiber is exposed, locations at which the losses occur can be determined. These locations can correspond to various types of user input.

18 Claims, 6 Drawing Sheets

FIBER-OPTIC TOUCH SENSOR

BACKGROUND

As people are increasingly using portable computing devices for a wider variety of purposes, it can be advantageous to adapt the ways in which people interact with these devices. While various types of touch-free input are being used for a variety of purposes, there are still various types of inputs that many people like to provide using a physical contact approach. For example, a user holding a cell phone to that user's ear might like to adjust a volume during a call by pressing volume buttons or spinning a volume wheel. Similarly, a user holding a personal data assistant might want to select a line of text using a side of the device, without having to use the user's other hand to manually select that line through a touch screen or similar input. Due to the number of types of possible input, it can be prohibitively expensive and/or complex to attempt to place enough physical dials or buttons around a periphery of the device to provide the desired functionality. Further, an over abundance of input mechanisms can make the device seem difficult to operate, or at least can make the device less visually appealing, which can negatively impact sales.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to providing input to, or determining information for, an electronic device. In particular, approaches discussed herein enable an electronic device to utilize one or more optical fibers, fiber bundles, or similar components to determine one or more locations where the user is touching the electronic device, in order to provide input to the device. In at least some embodiments, the electronic device can also detect changes in pressure applied to one or more of these optical elements through changes in the detected contact area of the user's finger(s) with respect to the element(s).

In various embodiments, a grouping of fiber optic elements is positioned at one or more locations on an electronic device, such as along the edges of the device, at the corners of the device, or at various other locations. At least a portion of each fiber optic element can be at least partially exposed with respect to an exterior of the electronic device such that a user is able to bring one or more forgers into contact with at least one of the exposed areas. In other embodiments, the fiber optic elements might include a deformable cladding or casing enabling a user to apply pressure at one or more locations with respect to the fiber optic elements. At least one set of light sources and at least one set of light sensors are positioned such that the light sources are each able to emit light into an end of at least one of the optical fibers and the light sensors are each able to detect at least a portion of that light when emitted from that fiber. The fibers in at least some embodiments comprise a medium formed of an optically transmissive material, such as a high purity glass (e.g., silica) or a clear polymer, with substantially few optical defects or contaminants that could otherwise affect the transmission of light within the medium. Further, the fibers typically are thin enough that the fibers are flexible for purposes such as twisting or bending into various shapes or locations.

The light sources (which in some embodiments could comprise a single physical source with the light split into multiple beams or other such configurations) can be positioned and/or configured such that the light from each light source internally reflects off of the internal edge, boundary, or surface of at least one fiber in order to propagate down the length of the fiber. The angle at which the light is incident on, and reflected from, the internal edge can be selected such that the light undergoes "total" internal reflection (TIR), whereby at least a majority of the light is reflected back into the medium with only a small amount of light being emitted from that edge due primarily to imperfections in the medium, contaminants on the edge, or other such issues. The light reflected back from the edge can then be detected by at least one light sensor. In some embodiments, the light might be reflected multiple times from the internal edge before being incident on a sensor.

Due to the difference in refractive indices between ambient air and the moisture, oils, and other materials present upon a user pressing a finger (or other such object or feature) on the transmissive material, the amount of light reflected and transmitted by the outer edge of a fiber can change based on the presence of a finger or similar object at the edge position at which a light path is incident. By monitoring changes in the intensity of light received to at least one respective light sensor, a computing device can determine whether (and when) a user contacts the edge at a given location. By using an array of fibers or light paths, the computing device can monitor various user interactions with various locations (e.g., the edge(s)) of an electronic device and determine various types of user input to the device in response to those interactions.

Many other alternatives and variations are described and suggested below in relation to at least some of the various embodiments.

Figure 1A:
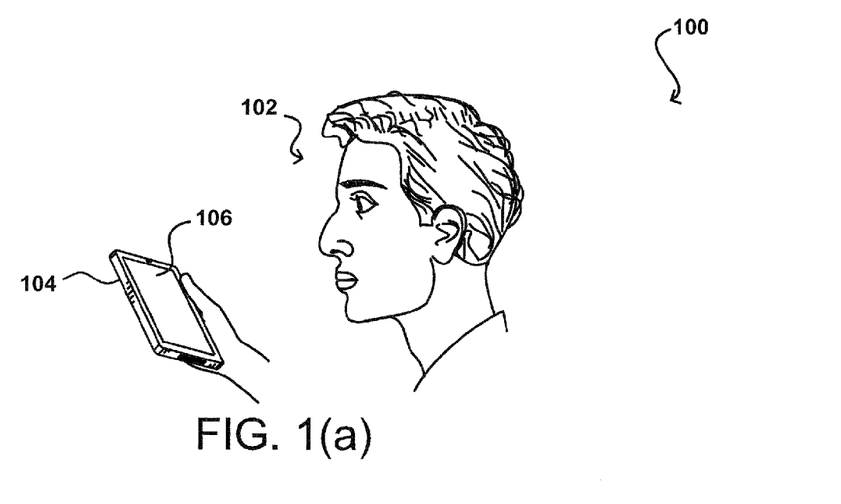
FIGS. 1(a) and 1(b) illustrate an example situation wherein a user is interacting with a computing device including a fiber optic touch sensor in accordance with various embodiments.

FIG. 1 illustrates an example situation 100 wherein a user 102 is interacting with a portable computing device 104. The computing device 104 can be any appropriate device, such as a smart phone, tablet computer, or personal data assistant. In this example, the user 102 is holding the device in the user's right hand. In many cases, the user can interact with one or more buttons on the side of the device, and depending on the size of the device can reach a portion of the keys on the front of the device or graphical elements displayed on a display screen 106. As mentioned, the number of buttons or physical input elements that can be placed on a side of the device can be limited due at least in part to space, visual appearance, or other such aspects. Further, if the user 102 uses the display element 106 to make selections the user might block at least a part of the display to provide input, and depending upon aspects such as the size and form factor of the device might have to use two hands to provide the desired input, which might be less than desirable for some users in at least certain situations.

Figure 1B:
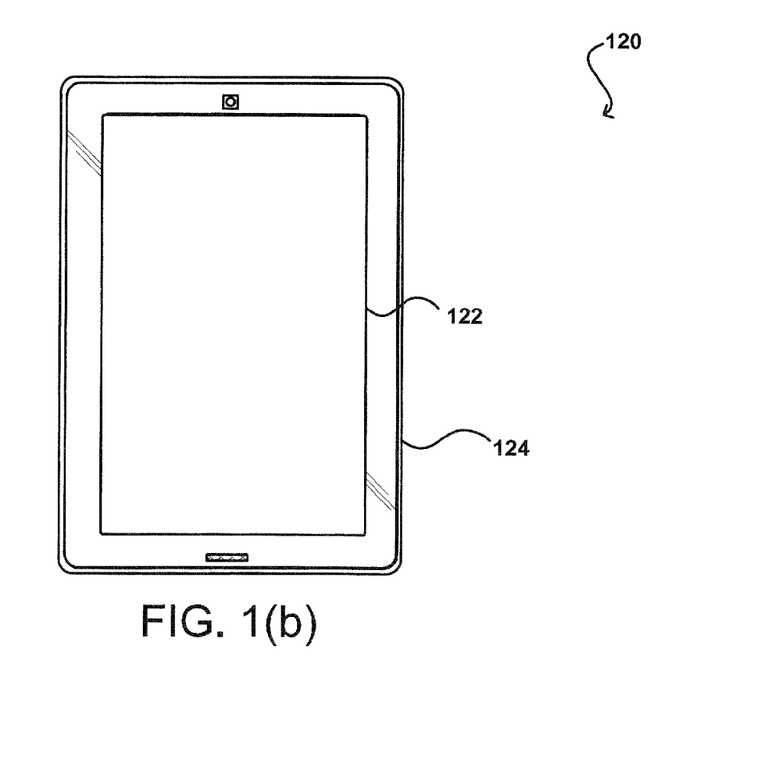

FIG. 1(*b*) shows an example of a computing device 120 in accordance with one embodiment that can enable a user to enter information through contact with the front surface of a display element 122. As known in the art, a multi-layer display element can provide for pressure-based input through resistive or capacitive touch-based approaches. A resistive touch-based element typically detects a touch location by the contact location of two layers of a resistive material of the display element. A capacitive touch-based approach detects a touch location by determining the change in the electrostatic field of a display element in response to the touch of an electrical conductor, such as a human finger. The touch functionality is typically provided via layers that are distinct from the actual display layer. While such elements could be used on the sides of a device as well, there can be various potential disadvantages to such an approach. For example, capacitive or resistive approaches might require use of a material on the edge of the device that is at least partially susceptible to damage, similar to the display on a device, and may be affected by changes in temperature or other such variations.

Approaches in accordance with various embodiments can take advantage of one or more optical fibers, fiber bundles, or other such optical elements to provide touch-based input at one or more locations on an electronic device. For example, FIG. 1(*b*) illustrates an example computing device 120 wherein one or more optical fibers 124 are positioned about a periphery, or outer edge, of the computing device. Although shown to go all the way around the edge of the device, it should be understood that there can be one or more portions or lengths of fiber at one or more locations about the device, and that even for a substantially continuous run of fiber there would need to be at least two endpoints or optical elements enabling light to be directed into, and captured from, the fibers. Using such an approach, a user can provide input to the device by touching, tapping, squeezing, shifting, or otherwise moving a finger or other such feature or object with respect to one or more positions of the fibers, in accordance with various processes and approaches discussed subsequently herein.

An advantage to using elements such as optical fibers is that optical fibers generally are flexible, enabling the fibers to be bent or shaped into various configurations. The properties of the fibers enable these fibers to still function as waveguides or light pipes even when shaped to have significant bends or non-linear patterns. At least some fibers utilize a transparent core surrounded by a deformable cladding or material (e.g., silicone rubber) having a lower index of refraction. When a user presses on an area of the deformable cladding, the ratio of refractive indices near that area can change such that the critical angle changes for purposes of total internal reflection (TIR). In other embodiments, the core may not include a cladding but might present an interface with a surrounding environment (e.g., ambient air) having a different index of refraction than the fiber core, where the ratio changes upon a user bringing a finger or other such object into contact with an area of the fiber. When the ratio changes, some of the light will no longer be reflected down the fiber but will be transmitted from that area, while still other portions of the light will be absorbed or will at least have the propagation angle adjusted such that the likelihood is reduced that the portion of light will continue down the core. This transmission will result in a loss in the intensity measured by a sensor measuring an intensity of light emitted from an end of that fiber.

In many cases, however, simply having a single binary input may not be sufficient to justify the cost of adding the fiber optic input to a device. It can be desirable in many instances to be able to provide multiple inputs using such an approach. Due to the speed of light and the relatively short run of the optical fibers, it can be difficult (particularly with components of portable consumer electronics that generally are relatively inexpensive) to determine when (and, thus, where) the user touched a fiber based on a timing of a change in measured intensity for a fiber. It therefore can be advantageous in at least some embodiments to provide a way to more easily distinguish position based upon changes in measured intensity (or other such information).

Figure 2:
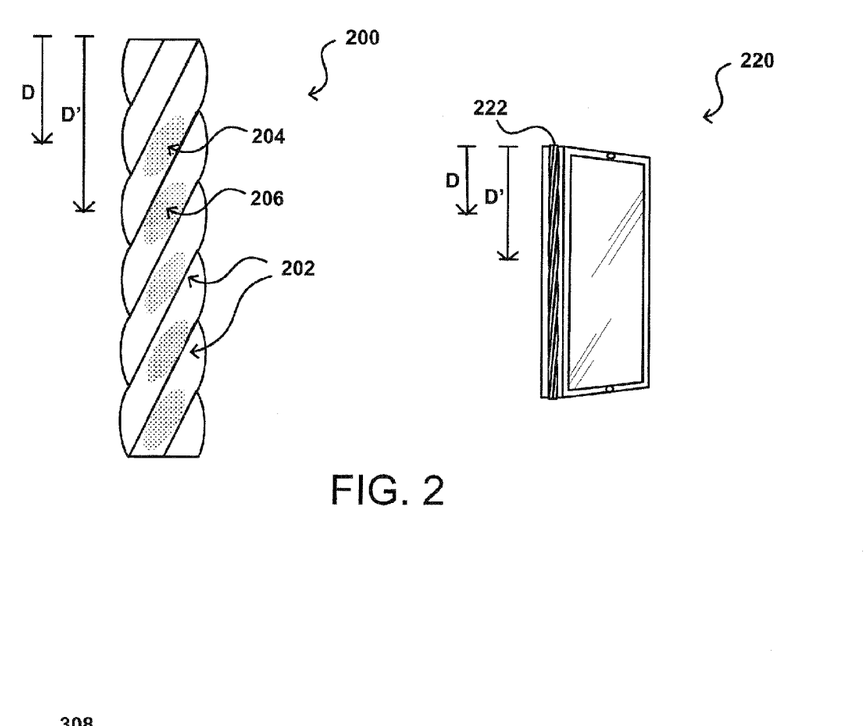
FIG. 2 illustrates top and device perspective views of a first configuration of a plurality of optical fibers that can be used in accordance with various embodiments.

FIG. 2 illustrates an example approach that can be used to provide position-based touch input in accordance with various embodiments. In this example, a twisted bundle of fibers 200 is used to provide multiple light paths along a run of the twisted bundle. If this bundle, such as the run of fibers 222 illustrated, is at least partially contained within an edge of an electronic device 220 then portions of that bundle can be exposed to contact by a human finger or other such object. For example, if the fiber bundle is thought of as being partially embedded in the plane of the figure and the "top" of the bundle with respect to the plane of the figure is at least partially exposed to contact, then a user can be able to contact regions 202 of the bundle as illustrated by the patterned areas in FIG. 2. In at least some embodiments, the fibers can be wound such that one such contact region exists for each fiber (as may depend upon factors such as the number of fibers, width of each fiber, etc.). If each fiber is exposed to contact at one region, then a drop of intensity in that fiber indicates that a user contacted the fiber bundle at the location corresponding to that region. By knowing where along the run of fibers each fiber is exposed, the system can determine the location where the user contacted the fibers. For example, if the user contacts exposed region 204, then the device (or a system or service in communication with the device) can determine that the user touched the fiber bundle within a given distance of distance D from the top end of the fiber bundle. If the user instead contacted the fiber at exposed region 206, the device can determine that the user touched the fiber within a given distance of distance D' from the top end of the fiber bundle.

In at least some embodiments, a more accurate location determination process can utilize the relative drop in intensity of signals measured from two adjacent fibers in the bundle. For example, if the user touches the fiber such that the user equally contacts regions 204 and 206, there would be a relatively equal drop in intensity of the light measured for the corresponding fibers. Thus, it could be determined that the user contacted the fiber bundle approximately midway between distances D and D'. Further, by looking at the relative changes in intensity for those two fibers in the case of an unequal drop in intensity, the touch location can be determined by interpolation or another such process, whereby the ratio of intensity drop is indicative of how far down between D and D' the user touched. Various other approaches can be used for such determinations as well in accordance with other embodiments.

As can be seen for the electronic device 220 in FIG. 2, the determined distance can be indicative of where along the side of the device the user touched the fiber bundle 222. In some embodiments, the device might make an initial determination as to a "default" state when a user is holding (or not holding) the device under current conditions. A default intensity value can be set for each fiber based on the amount of loss due to the user holding the device in contact with one or more of the fibers, an amount of contamination on the fibers, etc. Changes from this default intensity value then can be used to determine when a user touches one of the exposed portions of the fibers.

Such an approach can enable position-dependent input for the electronic device. For example, a user might be able to select an item by touching or pressing on the fiber at or near location D, and might be able to scroll to the next item by pressing at or near location D'. In other embodiments, a user might be able to adjust a volume or zoom level by moving a finger from distance D to distance D'. Various other inputs are possible as discussed and suggested elsewhere herein.

Figure 3:
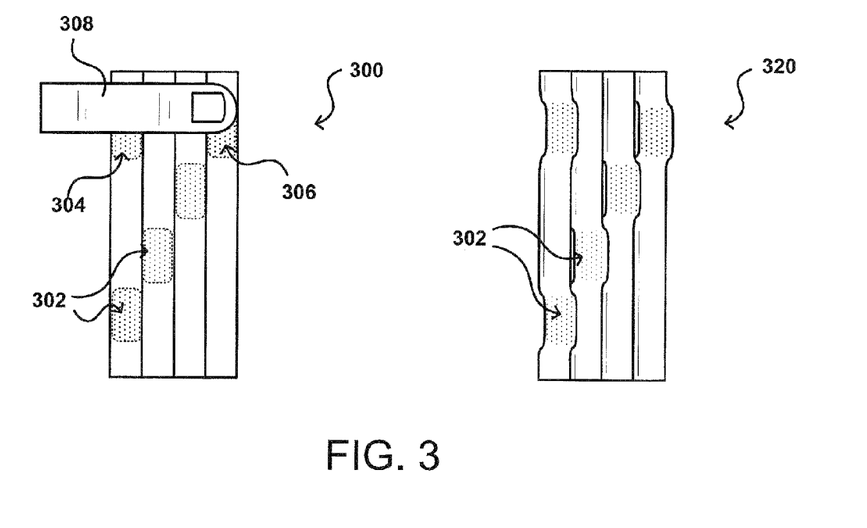
FIG. 3 illustrates top and perspective views of a second configuration of a plurality of optical fibers that can be used in accordance with various embodiments.

FIG. 3 illustrates another example configuration of optical fibers that can be used in accordance with various embodiments. In this example, the fibers 300 are not twisted, as shown in the top view, but instead have raised regions 302, bumps, protrusions, curves, or other portions where the fiber is shaped to enable contact with a finger or other object by a user. The regions where the fibers are exposed to contact by a user are shown by the patterned regions 302 and more apparent in the perspective view 320. As discussed previously, each fiber can have a region where the fiber is exposed over a given distance of the run of the fibers, such that a drop in intensity of light for one of those fibers is indicative of a relative position where a user touched the fiber, as may correspond to a desired input. As mentioned previously, the relative drop in intensity for adjacent fibers can also be used to provide a more granular position determination between two regions. In some embodiments, two or more fibers might have exposed regions 304, 306 at approximately the same distance along the run. Since these fibers are not adjacent in the fiber bundle or stack, a drop in intensity of for both fibers can be indicative that the user placed a finger 308 at the position illustrated in the figure, where the user is able to concurrently touch both fibers. In embodiments where a user is able to concurrently provide multiple touch inputs at different locations, such an approach might not be as practical as it might be difficult to distinguish whether the user had one finger at, for example, fiber two and another finger at fiber four, or a single finger that touched the bundle at a location where a single finger contacts regions for fibers two and four concurrently. The amount and type of deviation for each fiber can vary in different embodiments. Further, materials such as plastic or epoxy in some embodiments can be used to cover the fibers except for the exposed regions 302. In some embodiments, the whole fiber group might be covered by a deformable material that can contact the raised regions for purposes of touch input. Various other configurations are possible as well within the scope of the various embodiments.

Figure 4:
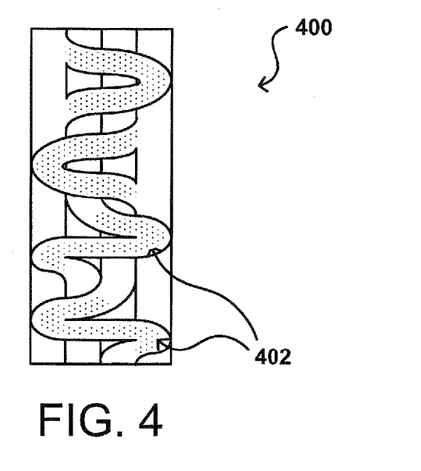
FIG. 4 illustrates a top view of a third configuration of a plurality of optical fibers that can be used in accordance with various embodiments.

As discussed, there can be various configurations of a plurality of fibers that can enable position determination through intensity loss in accordance with various embodiments. For example, FIG. 4 illustrates a run of fibers 400 wherein each fiber is wrapped "up and over" the other fibers over a given distance such that each fiber is exposed to contact over a specific region 402. As with the other examples, it should be understood that directions such as "up," "front," and "top" are used for explanation purposes only and are not meant to require specific orientations or directions unless otherwise stated. By knowing where along the run each fiber is exposed, which fibers are adjacent in the run, and other such information, positional touch information can be determined using approaches similar to those discussed with respect to other configurations presented herein. Various other patterns and configurations of the same number, fewer, or additional fibers can be used in accordance with the various embodiments.

Figure 5:
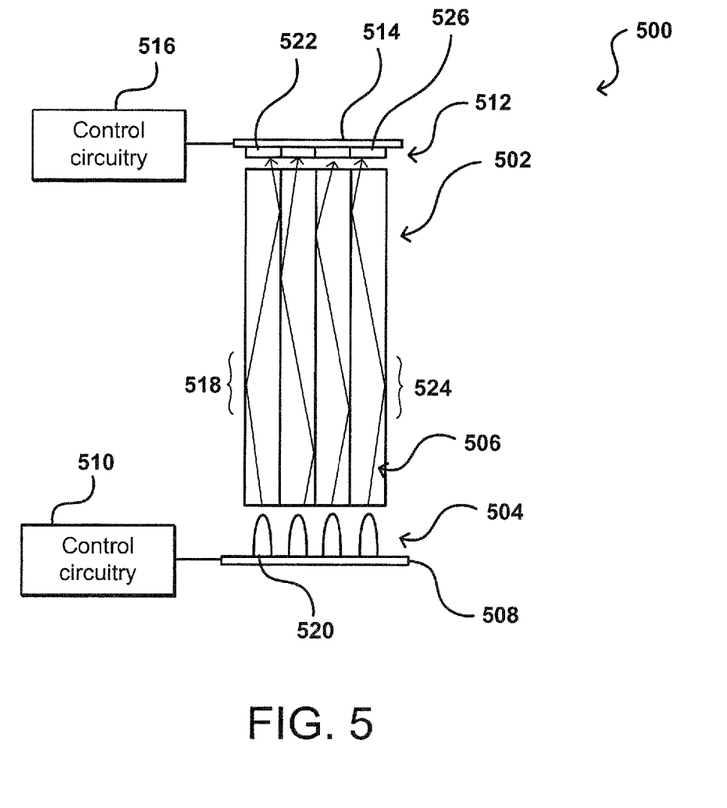
FIG. 5 illustrates an arrangement of emitters and sensors that can be used with a bundle of optical fibers to provide touch input in accordance with various embodiments.

FIG. 5 illustrates an example configuration 500 of a light bar 508, sensor bar 514, and fiber bundle 502 that can be used in accordance with various embodiments. It should be understood that the fibers are shown as linear runs in this example for purposes of clarity, but the fibers would be shaped or otherwise configured as discussed herein in various embodiments. In this example, there is one light source 504 (e.g., LED) for each of the fibers 502, although in other embodiments there could be fewer or additional light sources with optical elements configured to direct light from one or more sources into one or more fibers. In many embodiments the fibers will be single mode fibers with light of a single wavelength from a single light source propagating down each fiber. In other embodiments, the fibers might be multimode fibers capable of providing multiple propagation paths or transverse modes, etc.

In this example, the LEDs are part of a "light bar," which as used herein refers generally to any array or assembly of illumination elements that may or may not be connected to each other by a physical bar or other such assembly, but may simply be mounted on a printed circuit board (PCB) or flexible substrate, etc. In this example, the fibers 502 are shown in a "side" or "top" view, depending on the perspective, where the radiation propagating along the fibers is light (e.g., visible or infrared (IR)) from the light sources (e.g., LEDs) of the light bar. In some embodiments, the same light bar might be used for the touch input as is used for a display mechanism, with one or more optical elements or paths being used to direct light from one or more of the LEDs into a corresponding fiber.

The light bar 508 in this example includes a set of infrared LEDs 504, which can produce radiation that is undetectable to the human eye and can enable touch input to be provided without affecting the visible appearance of the exterior of the device. In other embodiments, however, colored light could be used to enable patterns or colors to be displayed on the sides or other regions of the device where the fibers are located. These LEDs can be driven by control circuitry 510 to control when light is directed into specific fibers or fiber runs.

In some embodiments, it can be desirable to separate the IR LEDs from the other LEDs, for any of a number of purposes such as space or heat concerns. In embodiments where multiple light bars are used, the separation of LEDs on different light bars further enables the different groups of LEDs to be controlled and activated separately, which can help to conserve power and reduce heat. For example, a right handed user might prefer to provide input on a different side of the device from a left handed holder, and applications such as games might require very different input than Web browsing or other such activities.

Also illustrated in FIG. 5 is a sensor bar 514 including an array of sensors 512 (e.g., radiation detectors, IR sensors, or photodiodes) for detecting light emitted from the fibers 502. In some embodiments, this might be a single sensor with multiple detection elements such that one or more of the elements can detect light emitted from each fiber. The sensor bar can be formed similar to the light bar in materials, configuration, and other such aspects, and can be operated by the same or different control circuitry 516 than is used to control the light sources 504. As discussed previously, light from the light sources can be directed into one end of the fibers and can be propagated down the fibers to be transmitted from the opposite end of the fibers and received by at least one respective sensor 512. While it is possible that some of the light will travel down the fiber without coming into contact with the edges or walls of the fibers, in many cases a significant portion of the light will be incident upon the edges or walls at least once along the length of the fiber. FIG. 5 illustrates single rays 506 propagating down the fibers at relatively sharp angles for purposes of illustration, but it should be understood that there typically would be multiple rays or a "spread" of light propagating down the fiber at angles that deviate only slightly from the primary propagation axis of each fiber, such that at least a portion of the light will contact the walls of the fiber at virtually every location along the fiber, and will be incident at an angle near the critical angle for TIR.

As discussed, the critical angle depends upon the ratio of refractive indices of the fiber and the material in contact with the fiber. Bringing a finger or other object into contact with the fiber changes the index ratio such that the critical angle changes and a portion of the light is lost to transmission and absorption, instead of reflection back into the fiber. For example, consider the light emitted from one of the light sources 520 that travels down a fiber and is detected by a corresponding sensor 522. If we consider a single ray as illustrated, a user contacting the fiber at or near region 518 can cause a portion of the light at that region to be transmitted instead of being reflected back into the fiber, resulting in a loss of intensity detected at the sensor 522. If the user's finger instead touched region 524 corresponding to a different fiber, the intensity detected at the corresponding sensor 526 would decrease. An application executing on the device, or a system or service in communication with the device, can utilize the change in intensity as detected by the various sensors to determine one or more locations where a user touched or contacted the fibers.

In the case of imperfections in one or more of the fibers or contamination on the edge or surface of the fiber, or other aspects inherent to the particular elements, a calibration procedure can be used that takes into account the corresponding variations in intensity. For example, if less light from one source is received than from the other sources due to a bubble or crack in the fiber, for example, this difference can be determined through a calibration procedure and used as a baseline or similar set of values from which variations will be measured.

Figure 6:
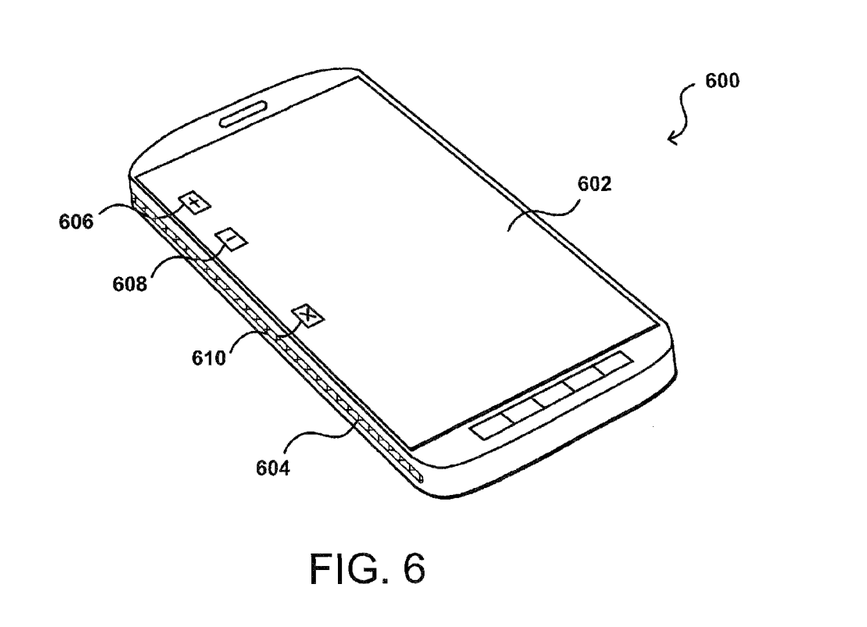
FIG. 6 illustrates an example computing device that can be utilized in accordance with various embodiments.

In order to provide touch-based input using at least some of the approaches discussed above, the user should be able to touch (or otherwise interact with) at least a portion of one or more runs, bundles, or other configurations of optical fibers at least partially exposed on a device in at least some embodiments. FIG. 6 illustrates an example of a computing device 600 where a run of optical fibers 604 is used to enable touch input. Although a single run of fibers on a single side of the device is shown, it should be understood that similar or alternative runs can be utilized on other sides, edges, faces, or locations on the device as well within the scope of the various embodiments. In this example, the fibers 604 run along an edge of the device in a configuration that is substantially parallel to an edge of a display screen 602 on the electronic device. Keeping the fibers at least partially embedded in the casing of the device helps to protect the fibers and avoid significantly changing the look and feel of the device. As discussed, in some embodiments the fibers can be at least partially covered by a portion of the casing that is deformable when a user presses a finger or other object against that portion of the casing. As discussed, the user can provide input by pressing on an appropriate region of the deformable casing, which in turn will contact a region of the fibers and cause a decrease in the intensity of light detected by at least one corresponding sensor. Such an approach enables touch input while protecting the fibers and preventing oil or other contaminants from collecting on the fibers.

In some embodiments, running similar sets of fibers down both sides of the device can enable side-independent input, where the user can provide the same input by touching corresponding locations on either side of the device 600. Further, such designs can also allow for "squeeze" type input, where a user provides input by concurrently contacting similar (or different) locations on both sides of the device, so as to touch both fiber bundles in similar regions. Further examples of providing side-independent and squeeze input can be found in co-pending U.S. patent application Ser. No. 13/240,993, filed Sep. 22, 2011, and entitled "Optical Touch Sensor," which is hereby incorporated herein by reference.

Also as illustrated in this figure, a computing device can be configured to display one or more graphical elements or other indicia on a display screen. In this example, the graphical elements might be displayed when the device is in an active call mode, where a first element 606 is displayed near a region of the fibers where a user is to touch or press to increase a call volume, a second element 608 is displayed near a region where the user is to touch or press to decrease a call volume, and a third element 610 is displayed to indicated to a user an area of the edge where the user can touch to hang up the call or perform a similar option. It should be understood that there can be any of a number of different elements displayed for any of a number of different functions, and that the selection can depend at least in part upon a current operational mode of the device, executing application, or other such aspect. In other embodiments, graphical icons might not be displayed, but visible light of one or more colors might be directed to different fibers to assist with device operation and/or input determination by the user. For example, if the fibers are twisted then directing a green light down the fiber that corresponds to a particular input location will be on the "outside" of the bundle at that region and thus will display green light near the location of the input. In some embodiments, a portion of the edge of each fiber can be frosted, ground, or otherwise processed to have a texture or roughness such that the light can be seen by a user when the light is incident upon that portion of the edge. The edge can also include another portion that might be substantially transmissive in order to allow for intensity change determinations as discussed elsewhere herein.

Figure 7:
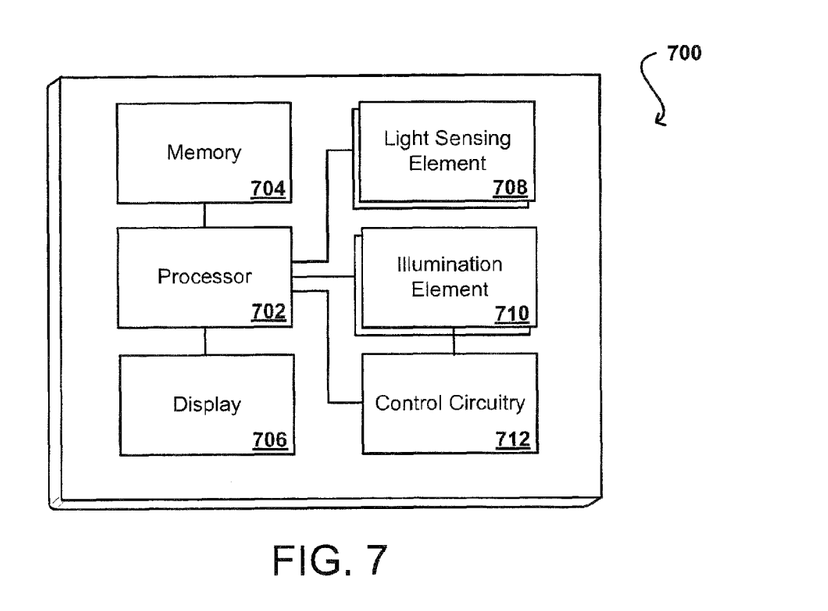
FIG. 7 illustrates an example set of components that can be utilized in a device such as that illustrated in FIG. 6.

FIG. 7 illustrates a set of basic components of an example computing device 700 such as the devices described with respect to FIG. 6. While a portable smart device is depicted in many examples herein, the computing device could be any appropriate device able to receive and process input commands, such as a personal computer, laptop computer, television set top box, cellular phone, PDA, electronic book reading device, video game system, or portable media player, among others. In this example, the device includes at least one processor 702 for executing instructions that can be stored in a memory device or element 704. As known in the art, the device can include many types of memory, data storage or non-transitory computer-readable storage media, such as a first data storage for program instructions for execution by a processor 702, a separate storage for images or data, a removable memory for sharing information with other devices, etc.

The device typically will include at least one type of display element 706, such as a liquid crystal display (LCD), organic light-emitting diode (OLED) display, a plasma display, or a digital light processing (DLP) display, as discussed herein. As mentioned, the device can include one or more illumination elements 710, such as IR LEDs, laser diodes, or other such components, positioned with respect to the optical fibers such that at least a portion of the light or radiation transmitted into the fibers undergoes total internal reflection at least when the interface of the fibers is with ambient air or another such environment. The generation and timing of the radiation emission from the illumination element(s) 710 can be controlled using various control circuitry including components known and configured for purposes such as pulsing LEDs. At least a portion of the light or radiation transmitted from the fibers can be detected by one or more light or radiation sensing elements 708, such as IR sensors or light detectors, photodiodes, and the like. In at least some embodiments, illumination elements 710 and light sensing elements 708 are configured to handle IR radiation over an appropriate wavelength, such as 940 nm or other wavelengths above 900 nm. The detectors can be any appropriate detectors, such as CMOS sensors operable to detect radiation in a wavelength range of at least, for example, 910 nm to 970 nm. In embodiments using multiple IR LEDs, the LEDs can be scanned in sequence for some applications in order to reduce power consumption or simplify touch location determination. For other applications, various subsets of the IR LEDs can be used at different times in order to illuminate various portions or regions, etc.

An example computing device also can include other components, such as at least one motion-determining element (e.g., an accelerometer or gyro element) that can be used to determine motion of the device, which can be used to trigger or adjust a touch input mode as discussed elsewhere herein. The device can also include at least one image capture element for capturing ambient light image information about the user of the device. The imaging element may include, for example, a camera, a charge-coupled device (CCD), a complementary metal-oxide-semiconductor device (CMOS), a motion detection sensor, or a radiation sensor, among many other possibilities.

The device can support other types of input as well. For example, the device can include a touch- and/or pressure-sensitive element around at least a portion of the device, such as on the back and/or sides of the device. Using such material, the device is able to determine whether a user is actively holding the device and/or can enable the user to apply input by squeezing at least a portion of the device. The input information could be used to trigger a detection mode or other such process. The device can also include a microphone or other such audio-capturing device. The device in at least some embodiments can trigger various actions or modes based upon sound detected by the microphone. For example, if the device detects speech from a person, the device might activate a detection mode to enable that person to provide motion input. The device can include at least one additional input device able to receive conventional input from a user. This conventional input can include, for example, a push button, touch pad, touch-sensitive element used with a display, wheel, joystick, keyboard, mouse, keypad or any other such device or element whereby a user can input a command to the device.

In some embodiments, one or more icons or other notifications might be displayed on the device to indicate to the user that IR illumination is active, or that touch determination is being performed. In some embodiments, a light (e.g., LED) on the device might illuminate in order to notify the user that touch detection is activated in order to signal to the user that the user can provide input via various motions or finger positions. Various other notifications can be used as well as appropriate.

Figure 8:
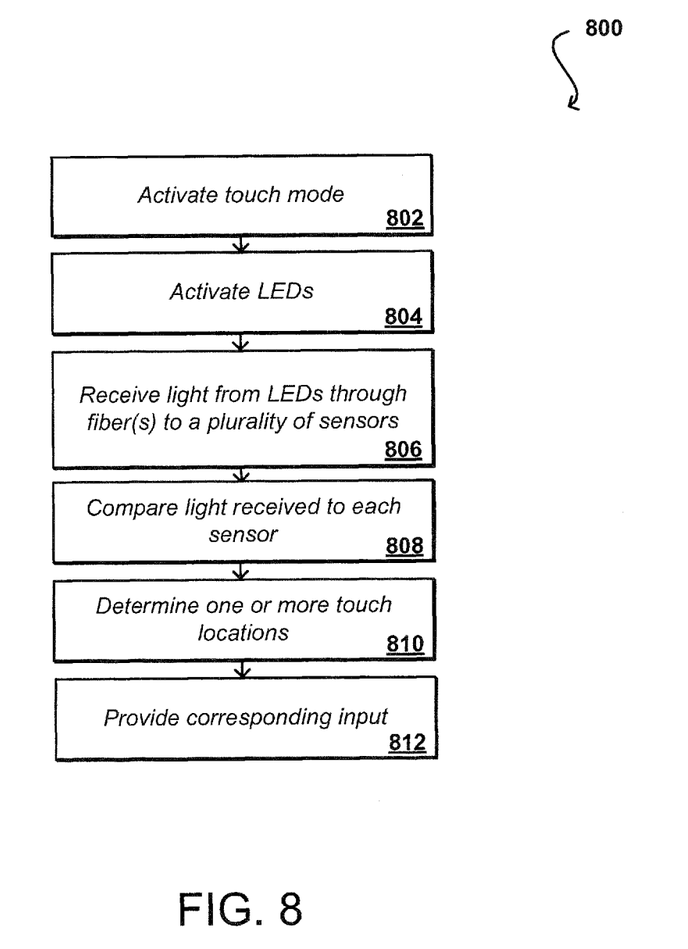
FIG. 8 illustrates an example process for determining one or more user touch locations that can be utilized in accordance with various embodiments.

FIG. 8 illustrates an example process 800 for determining touch input in accordance with various embodiments. It should be understood, however, that there can be additional, fewer, or alternative steps performed in similar or alternative orders, or in parallel, within the scope of the various embodiments unless otherwise stated. In this example, touch mode is activated 802 on a computing device. In some embodiments, touch mode can be active any time the device is active (and touch input is enabled by the user), upon the user manually activating touch mode, upon opening an appropriate application on the device, or upon any other such action or event. In some embodiments, touch mode might be activated upon detecting motion near the device, the presence of a user near the device, upon detecting a user gesture, or upon detecting the user picking up the device. Upon touch mode being activated, one or more LEDs or other such light sources can be activated 804 in order to provide the light needed for touch detection. As discussed, this can involve one or more light sources (and/or optical components) directing light into one or more optical fibers such that at least a portion of the light will be propagated down the fibers, which may include being reflected from one or more locations along the side of the fiber during the propagation. The LEDs can be activated at any appropriate time, such as upon detecting motion, for a period of time after a determined action or event, periodically, or continually, among other times or approaches. The light propagated down the fibers can be received 806 by one or more light sensors, or at least portions, segments, or pixels of one or more light sensors. As mentioned, there might be one sensor per fiber or various combinations of sensors and fibers. The intensity received to the sensors from the various fibers can be compared 808 and/or analyzed to determine a relative intensity between sensors, an overall intensity pattern, light losses for different fibers, or other such intensity information. Using any of the approaches discussed or suggested herein, the variations in received intensity among the various sensors can then be used to determine 810 one or more locations along at least one fiber where the user contacted the fibers with a finger or other such object. As discussed, various options exist that can enable multiple touch points or types of input to be detected and processed in accordance with the various embodiments. An appropriate input corresponding to the touch position(s) then can be determined 812, as may cause one or more appropriate actions to be performed on the computing device.

In many embodiments discussed herein, the touch locations are determined using a "loss" in the amount of light received to one or more of the sensors due to the presence of a human finger along a fiber causing some of the light to be transmitted from the contact position and absorbed by the user's finger. In at least some embodiments, the sources of this light could be modulated such that the sensors are looking for light at a particular pulsing frequency, such as pulsing frequencies in the range of 10 kHz to 1 MHz. If the sensors are able to sufficiently lock into that pulsing frequency, other light can be differentiated and discarded or used for filtering. This other light could be, for example, ambient light incident on the transmissive medium from the surrounding environment. In one embodiment, an LED is modulated to 200 kHz, and the receiving circuit is tuned to that modulation frequency as well in order to reject other light, such as may include ambient light or light from the display. In some embodiments, different LEDs can be modulated at different frequencies, with the sensors and/or receiving circuitry being modulated to corresponding frequencies such that light from different LEDs can be separated by modulation frequency even when those sources are received concurrently to the sensors, etc.

In some embodiments the LEDs can be pulsed for a very short burst at a determined frequency, which can significantly reduce the amount of power consumed. For example, if the LEDs are pulsing at 100 kHz then the photodiode reading circuitry might utilize a filter that only enables pulses at 100 kHz to pass. In addition to electronic filtering, some optical filtering may be employed, for example if IR LEDs are used the photodiodes might utilize relatively small filters that pass IR light but block visible light as might enter from the ambient lighting or from the display backlight. In some embodiments, the photodiodes can be AC coupled such that any DC component (i.e., resulting from the room light or daylight) is ignored. Further, the photodiodes can be very low power components such that use of low duty cycle modulation for the LEDs can help provide for a very low power device, in addition to the immunity to ambient light.

As mentioned, any or all of the outer surface of a fiber can be exposed for contact by a human finger or other such object. In at least some embodiments, however, a casing material such as a rubber or polymer material can be placed around at least a portion of the fiber that can be deformed due to pressure from a human finger. In some embodiments, the casing material might directly contact the fibers, while in other embodiments a material of a selected refractive index can be positioned between the rubber and the fibers to increase (or control) the amount of light transmitted. Such an approach would enable light to be coupled into, and absorbed by, the casing material without having to expose the surface of the fibers to potential damage.

As discussed, using angles near the critical angle can be potentially problematic in some situations, as and any collection or oil, dirt, or other contaminants on the surface can cause an appreciable amount of light to be lost via the interface, although periodic calibration and/or adjustment can handle relatively slow variations in reflected intensity over time. In at least some embodiments, a touch detection algorithm is not searching for an absolute intensity threshold value but a relative threshold value indicating contact, such that the long term averages or other adjustments can handle many issues with contamination, oil accumulation, and the like.

As mentioned, the light sources can be discrete sources or part of a single component. For example, a package to be added to a computing device might include multiple LED elements and pin photodiodes placed on a substrate such as a board or flex. Such a package then can be at least partially embedded in, or otherwise positioned with respect to, an edge of the device. The package can be positioned along an entire edge, or at least a portion at least one edge, of a device, where utilizing the entire edge can help to reduce potential alignment issues. There also can be varying amount of interleaving of LEDs, photodiodes, and other such components in the various embodiments.

The timing of the various light sources can also be adjusted, varied, and/or controlled differently among various embodiments and/or for various use cases. For example, LEDs may not need to be flashed at the same time but can be flashed in sequences of various orders. Flashing at the same time might result in cross-talk or other such issues for at least some embodiments, such that it can be preferable to flash each light source separately and examine the corresponding flash at each photodiode. The flashing frequency can be very fast, such as on the order of microseconds, such that there might be no noticeable delay on the part of the user. The flashing frequency can be selected so as to not interfere with other components on the device, such as a camera or radio frequency component. Another potential advantage to flashing the LEDs in sequence is that there does not need to be a separate photodiode or detector for each fiber. A single photodiode can be used to receive the light emitted from the various fibers when the system is able to correlate the timing of the pulses with the corresponding LED, such that the intensity measurement can be correlated with the appropriate fiber.

In some embodiments, a computing device can detect when the device is being picked up and/or held using any appropriate component(s), such as an inertial sensor or accelerometer, electronic gyroscope, touch sensitive material, and the like. When the device determines it is being held, for example, the device can determine a baseline intensity pattern corresponding to a time when the user is not contacting an edge of the transmissive material. When the user then contacts a fiber, the difference in intensity can be determined relative to that baseline under current conditions. Further input can be determined based upon the way in which the intensity pattern changes. For example, a user tapping a location will provide a very easy to distinguish change in the intensity pattern with distinct loss variations. A user might tap to perform an action such as to take a picture or select an item. A user also might slide a finger along a portion of an edge to, for example, zoom in or out in an image viewing application, which can also provide a distinguishable change in the detected intensity pattern. Various other motions, gestures, or actions can provide distinguishable intensity pattern changes as well.

In at least some embodiments the touch detection can further be used to at least partially identify or authenticate a user of the device. For example, a user might typically contact the edges of the device in a certain way, such as with a certain separation of finger touch positions based on the way the user holds the device and/or physical aspects of the user's fingers. Similarly, the size of a user's fingers can cause a certain range of intensity changes due at least in part to the amount of edge area that can be contacted by that user's finger. By monitoring the way in which a user contacts the device, the device can provide a first level of security as to whether the current user matches the expected user or at least an authorized user.

As mentioned, the pressure of a touch can be determined in addition to the localization of that touch by quantifying the light lost. Further, multiple concurrent touches or touch motions can be determined for one or more edges. Various approaches known for such optical purposes can be used to reduce noise and background signal and increase signal-to-noise ratio and sensitivity. For example, the LEDs can be modulated on and off, with the readings at the off stage being averaged and then subtracted from the on state readings.

Figure 9:
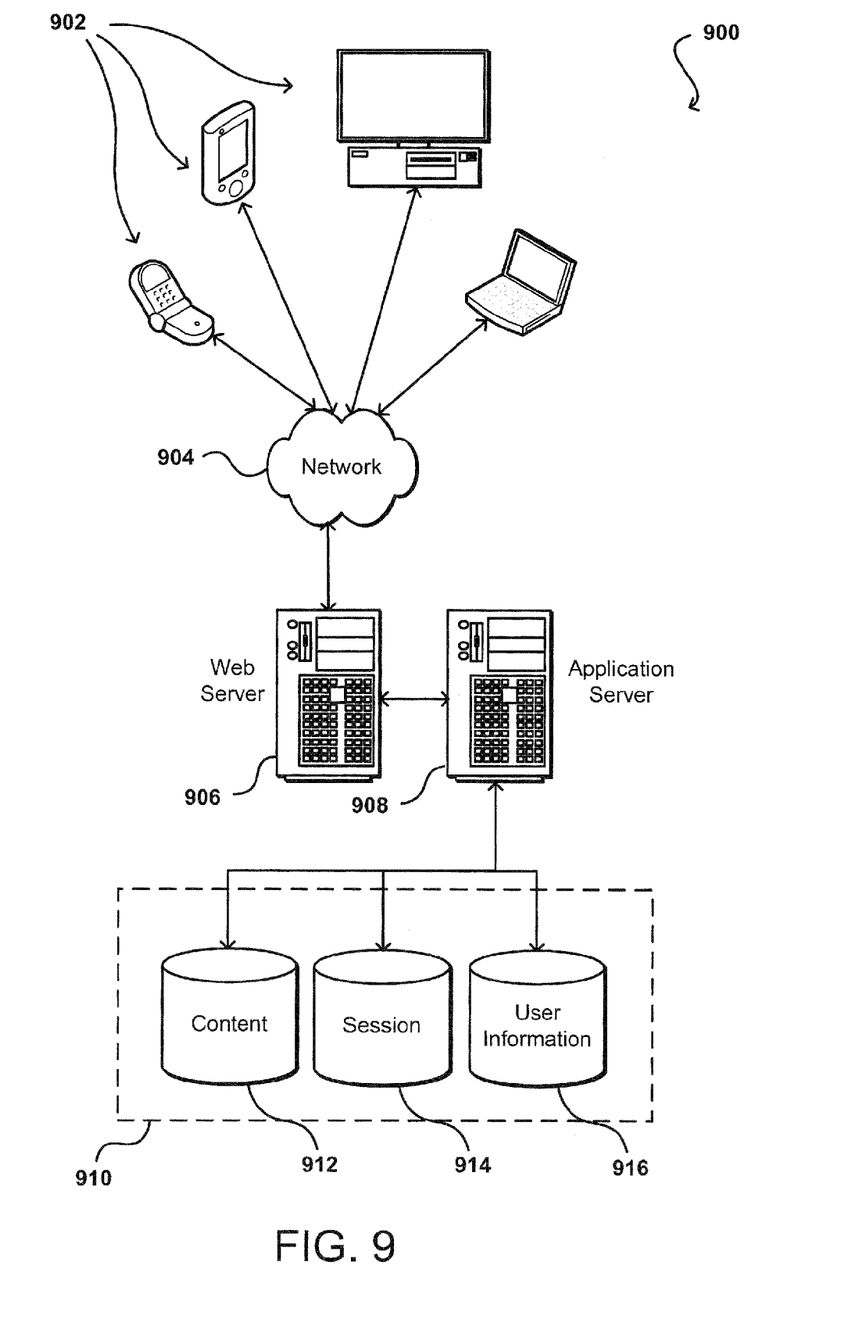
FIG. 9 illustrates an example an environment in which various embodiments can be implemented.

A computing device used for such purposes can operate in any appropriate environment for any appropriate purpose known in the art or subsequently developed. Further, various approaches discussed herein can be implemented in various environments for various applications or uses. Portions of the analysis also can be sent or offloaded to remote devices which might have more available resources and/or capacity. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The environment 900 shown includes a variety of electronic client devices 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. Each client device can be capable of running at least one motion or orientation-controlled interface as discussed or suggested herein. In some cases, all the functionality for the interface will be generated on the device. In other embodiments, at least some of the functionality or content will be generated in response to instructions or information received from over at least one network 904.

The network 904 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a primary content provider 906 and a supplemental content provider 908. Each provider can include at least one Web server 906 for receiving requests from a user device 902 and serving content in response thereto, although for other networks an alternative device serving a similar purpose could be used as would be apparent to one of ordinary skill in the art.

Each content provider in this illustrative environment includes at least one application server 912, 914, 922 or other such server in communication with at least one data store 916, 918, 924. It should be understood that there can be several application servers, layers, and/or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. An application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 902 and an application server, can be handled by the respective Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

Each data store can include several separate data tables, databases, or other data storage mechanisms and media for storing data relating to a particular aspect. For example, the page data store 916 illustrated includes mechanisms for storing page data useful for generating Web pages and the user information data store 918 includes information useful for selecting and/or customizing the Web pages for the user. It should be understood that there can be many other aspects that may need to be stored in a data store, such as access right information, which can be stored in any of the above listed mechanisms as appropriate or in additional mechanisms in the data store. Each data store is operable, through logic associated therewith, to receive instructions from a respective application server and obtain, update, or otherwise process data in response thereto. In one example, a user might submit a search request for a certain type of content. In this case, the data store might access the user information to verify the identity of the user, and can access the content information to obtain information about instances of that type of content. The information then can be returned to the user, such as in a results listing on a Web page that the user is able to view via a browser on the user device 902. Information for a particular instance of content can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature, and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
    a plurality of optical fibers positioned substantially along at least a portion of at least one side adjacent to a face of the computing device, the plurality of optical fibers being separate from a touch screen of the computing device, each of the plurality of optical fibers being twisted and having at least one respective designated region exposed to contact by a finger of a user, each designated region corresponding to a respective location on the computing device;
    at least one infrared (IR) light emitting diode (LED) positioned to direct IR radiation into the plurality of optical fibers such that at least a portion of the IR radiation that is incident on an internal surface of the at least one designated region of a first optical fiber of the plurality of optical fibers undergoes total internal reflection (TIR) when the at least one designated region of the first optical fiber is not in contact with a finger of a user;
    at least one IR detector operable to detect IR radiation transmitted through the plurality of optical fibers; and
    a processor configured to execute instructions to analyze the IR radiation to determine a change in intensity for the first optical fiber, the change in intensity being measured based at least in part on a twisting and an orientation of the first optical fiber with respect to the computing device, the change in intensity being indicative of a user contact with the at least one designated region, the at least one designated region associated with the user contact being indicative of input to be provided to the computing device.

2. The computing device of claim 1, further comprising:
    control circuitry in electronic communication with the processor and operable to selectively activate the at least one IR LED in response to a control signal from the processor.

3. The computing device of claim 1, wherein the plurality of optical fibers is partially embedded in a casing of the computing device.

4. A computer-implemented method of determining input to a computing device, comprising:
    directing light from a light source into a receiving end of an optical fiber of a computing device, the optical fiber having at least one region along a boundary of the optical fiber, at least a portion of the light being incident upon an optical surface corresponding to the at least one region so as to propagate through the optical fiber when the at least one region is not in contact with an external object;
    detecting, using at least one light sensor, at least a portion of the light transmitted from a transmission end of the optical fiber;
    monitoring, using at least one processor of the computing device, changes in intensity of light detected by the at least one light sensor;
    detecting a decrease in intensity at least meeting an intensity threshold;

determining, via the at least one processor, a position along the optical fiber from which a portion of the light was lost in response to an external object being brought into contact with the at least one region of the optical fiber; and utilizing information about the position to determine input to be provided to the computing device, wherein the optical fiber is part of an optical fiber bundle including a plurality of optical fibers, wherein the at least one sensor is operable to detect at least a portion of the light transmitted from a respective transmission end of each of the optical fibers, a detected decrease in intensity for any selected optical fiber of the plurality of optical fibers being indicative of the external object being brought into contact with the at least one region of the selected optical fiber, and wherein the optical fiber bundle is twisted, the at least one region of each optical fiber being determined at least in part by a twisting and an orientation of the optical fiber bundle with respect to the computing device.

5. The computer-implemented method of claim 4, wherein each optical fiber in the optical fiber bundle is shaped to be exposed to contact by the external object over a range of distances determined at least in part by a respective shape of each optical fiber.

6. The computer-implemented method of claim 5, wherein the respective shape includes being positioned over, or raised with respect to, other fibers in the optical fiber bundle over the range of distances.

7. The computer-implemented method of claim 4, wherein the optical fiber is at least partially embedded in a casing of the computing device.

8. The computer-implemented method of claim 4, wherein the intensity threshold is a relative threshold with respect to a current intensity profile determined with respect to a surrounding environment.

9. The computer-implemented method of claim 4, wherein the light source is one of a plurality of light sources each operable to direct a path of light into a respective optical fiber.

10. The computer-implemented method of claim 4, further comprising:
determining an amount of contact area of the external object with the optical fiber based at least in part on an amount of pressure being applied by the external object.

11. The computer-implemented method of claim 4, wherein the optical fiber comprises a transmissive core and a deformable cladding, and the at least one region corresponding to a portion of the optical fiber where the external object is capable of deforming the deformable cladding to cause a portion of the light to be absorbed by the deformable cladding.

12. A computing device comprising:
a processor;
a first optical fiber having at least one region along a boundary of the first optical fiber, wherein the first optical fiber is positioned substantially along at least a portion of at least one side adjacent to a face of the computing device, the first optical fiber being separate from a touch screen of the computing device, the first optical fiber being part of an optical fiber bundle including a plurality of optical fibers;
a light source positioned to direct light into a first end of the first optical fiber;
a light sensor positioned to receive light emitted from a second end of the first optical fiber; and
a memory device including instructions, when executed by the processor, cause the computing device to:
measure an intensity of light emitted from the first optical fiber using the light sensor;
determine a baseline intensity profile for the computing device when the at least one region of the first optical fiber is not in contact with an object;
monitor changes in the intensity of light emitted from the first optical fiber and detected by the light sensor with respect to the baseline intensity profile;
determine a change in intensity for the first optical fiber based at least in part on a twisting and an orientation of the first optical fiber with respect to the computing device;
determine a position along the first optical fiber brought into contact with the object based at least in part upon the change in intensity;
determine an input corresponding to the position; and
process the input using the processor.

13. The computing device of claim 12, wherein the instructions when executed further cause the computing device to:
determine the input by determining a position where the object was brought into contact with the at least one region of the first optical fiber, resulting in a decrease in intensity of the light emitted from the first optical fiber, and by determining a type of motion of the object with respect to that position.

14. The computing device of claim 13, wherein the type of motion of the object includes at least one of a tap, a slide, a press, or a squeeze of at least one human finger with respect to the at least one region.

15. The computing device of claim 12, wherein the first optical fiber is shaped to provide the at least one region as part of the optical fiber bundle.

16. The computing device of claim 12, further comprising:
a deformable casing material positioned around at least a portion of the boundary of the first optical fiber, the deformable casing material protecting the first optical fiber while enabling light to be transmitted from the first optical fiber into the deformable casing upon pressure being applied to at least one location on the deformable casing material.

17. A non-transitory computer-readable storage medium storing instructions for determining input to an electronic device, the instructions when executed by a processor causing the electronic device to:
cause a light source to direct light into an optical fiber having a determined region along a boundary of the optical fiber;
measure an intensity of light emitted from the optical fiber using a light sensor;
determine a baseline intensity profile for the electronic device when the determined region of the optical fiber is not in contact with an object;
monitor changes in the intensity of light emitted from the optical fiber and detected by the light sensor;
detect a decrease in intensity of light with respect to the baseline intensity profile; and
determine an input corresponding to a position of the determined region,
wherein the optical fiber is part of an optical fiber bundle including a plurality of optical fibers,
wherein the light sensor is operable to detect at least a portion of the light transmitted from a respective transmission end of each of the optical fibers, a detected decrease in intensity for any selected optical fiber of the plurality of optical fibers being indicative of the object being brought into contact with the determined region of the selected optical fiber, and wherein the optical fiber bundle is twisted, the respective determined region of each optical fiber being determined at least in part by a twisting and an orientation of the optical fiber bundle with respect to the electronic device.

18. The non-transitory computer-readable storage medium of claim 17, wherein each fiber in the optical fiber bundle is shaped to be exposed to contact by the object over a range of distances determined at least in part by a respective shape of each fiber.

\* \* \* \* \*